(12) United States Patent
Wang et al.

(10) Patent No.: US 6,583,240 B2
(45) Date of Patent: *Jun. 24, 2003

(54) ETHYLENE POLYMERIZATION PROCESS

(75) Inventors: Shaotian Wang, Mason, OH (US); Jean A. Merrick-Mack, West Chester, OH (US)

(73) Assignee: Equistar Chemicals, LP, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/863,536

(22) Filed: May 23, 2001

(65) Prior Publication Data

US 2002/0177675 A1 Nov. 28, 2002

(51) Int. Cl.⁷ .................................................. C08F 4/44
(52) U.S. Cl. ..................... 526/153; 526/131; 526/151; 526/134; 526/148; 526/160; 526/170; 526/348; 526/348.2; 526/348.5; 526/348.6; 526/351; 526/352
(58) Field of Search ................................ 526/160, 170, 526/943, 134

(56) References Cited

U.S. PATENT DOCUMENTS

| | | | |
|---|---|---|---|
| 5,539,124 A | * 7/1996 | Etherton et al. ............. 548/402 |
| 5,554,775 A | 9/1996 | Krishnamurti et al. ......... 556/7 |
| 5,637,659 A | 6/1997 | Krishnamurti et al. ...... 526/133 |
| 5,637,660 A | 6/1997 | Nagy et al. ................. 526/160 |
| 5,756,611 A | 5/1998 | Etherton et al. ............. 526/127 |
| 5,859,157 A | 1/1999 | Gupte et al. ................. 526/88 |
| 6,034,027 A | 3/2000 | Krishnamurti et al. ...... 502/200 |
| 6,127,484 A | 10/2000 | Cribbs et al. ............... 525/191 |
| 6,211,311 B1 | 4/2001 | Wang et al. ................. 526/131 |
| 6,291,386 B1 | * 9/2001 | Wang ......................... 502/124 |

FOREIGN PATENT DOCUMENTS

WO    WO 93/08221    4/1993

OTHER PUBLICATIONS

R. N. Shroff and H. Mavridis "Long–Chain–Branching Index for Essentially Linear Polyethylenes," *Macromolecules* 1999, 32, 8454–8464.

* cited by examiner

*Primary Examiner*—David W. Wu
*Assistant Examiner*—Rip A. Lee
(74) *Attorney, Agent, or Firm*—Shao Guo

(57) ABSTRACT

An ethylene polymerization process is disclosed. The polyethylene has a long-chain-branching index (LCBI) of 1 or greater. The process uses a single-site catalyst that contains a boraaryl ligand. The catalyst is alkylated with triisobutyl aluminum.

13 Claims, No Drawings

ETHYLENE POLYMERIZATION PROCESS

FIELD OF THE INVENTION

The invention relates to ethylene polymerization using single-site catalysts. More particularly, the invention relates to a process that produces polyethylene having an increased long-chain-branch index.

BACKGROUND OF THE INVENTION

Single-site catalysts for olefin polymerization are known. They can be divided into metallocenes and non-metallocenes. Metallocene single-site catalysts are transition metal compounds that contain cyclopentadienyl (Cp) or Cp derivative ligands. Non-metallocene single-site catalysts contain ligands other than Cp but have similar catalytic characteristics to the metallocenes. The non-metallocene single-site catalysts often contain heteroatomic ligands, e.g., boraaryl (see U.S. Pat. No. 6,034,027), pyrrolyl (U.S. Pat. No. 5,539,124), azaborolinyl (U.S. Pat. No. 5,756,611) and quinolinyl (U.S. Pat. No. 5,637,660). Single-site catalysts produce polyethylenes having many properties that are not available to those made with Ziegler catalysts, for example, narrow molecular weight distribution and low density.

Successful production of polyethylene with the newly developed single-site catalysts offers many challenges. First, the catalysts often need to be modified for desirable activity and stability. For example, copending Appl. Ser. No. 09/318, 009 teaches in-situ alkylation of a transition metal complex that has at least one labile ligand with an alkyl aluminum compound in the polymerization system.

Polyethylene and other olefin polymers made with single-site catalysts are highly desirable if they can be produced in existing equipment. Successful commercial production often requires the polyethylene to have a relatively high bulk density (usually greater than about 0.30 g/cm$^3$). Low bulk density gives a low production rate, causes difficulty in operation, and often results in inferior product quality. Copending Appl. Ser. No. 09/593,878 (Docket No. 88-1023A) teaches how to increase bulk density of polyethylene by premixing supported boraaryl single-site catalysts with an alkyl aluminum.

Moreover, single-site catalysts often produce olefin polymers of narrow molecular weight distributions. The uniformity of molecular weight distribution, although improving tensile strength and other physical properties of polymer products, makes the thermal processing more difficult. U.S. Pat. No. 6,127,484, for example, teaches a multiple-zone, multiple-catalyst process for making polyethylene. The polymer produced has a broad molecular weight distribution and improved processability.

It is also known that increasing long-chain branching can improve processability of polyethylene made with single-site catalysts (see WO 93/08221). The existence of long-chain branching in polyethylene is particularly important for blown film extrusion and blow molding processes. However, achieving long-chain branching often requires the use of specific catalysts. For example, WO 93/08221 teaches how to increase the concentration of long-chain branches in polyethylene by using constrained-geometry single-site catalysts.

New methods for increasing long-chain branching in polyethylene are needed. Ideally, the method would use a readily available single-site catalyst and would be easy to practice.

SUMMARY OF THE INVENTION

The invention is a process for producing polyethylene. The process uses a Group 4 metal single-site catalyst that contains at least one boraaryl ligand. The catalyst is alkylated with triisobutyl aluminum (TIBAL). The process gives a polyethylene having an increased long-chain-branch index (LCBI).

We have surprisingly found that when the catalyst is alkylated with TIBAL, the polyethylene produced has LCBI greater than about 1. When the catalyst is not alkylated or is alkylated with triethyl aluminum, the polyethylene has LCBI less than 1.

DETAILED DESCRIPTION OF THE INVENTION

The invention is a process for making polyethylene having an increased long-chain-branch index (LCBI). LCBI is a rheological index used to characterize low levels of long-chain branching in essentially linear polyethylenes. LCBI is defined as:

$$LCBI = \frac{\eta_0^{0.179}}{4.8 \cdot [\eta]} - 1$$

where $\eta_0$ is the limiting, zero-shear viscosity (Poise) at 190° C. and $[\eta]$ is the intrinsic viscosity in trichlorobenzene at 135° C.(dL/g). LCBI is based on observations that low levels of long-chain branching, in an otherwise linear polymer, result in a large increase in melt viscosity, $\eta_0$, with no change in intrinsic viscosity, $[\eta]$. See R. N. Shroff and H. Mavridis, "Long-Chain-Branching Index for Essentially Linear Polyethylenes," Macromolecules, Vol. 32 (25), pp. 8454–8464 (1999). Higher LCBI means a greater number of long-chain branches per polymer chain. When LCBI equals zero, there is no long-chain branching.

A Group 4 metal single-site catalyst is used. Preferably, the metal is zirconium. The catalyst contains at least one boraaryl ligand. Suitable boraaryl ligands include substituted or unsubstituted borabenzenes, boranaphthalenes, boraanthracenes, and boraphenanthrenes. Preferably, the boraaryl ligand is borabenzene or a substituted borabenzene, e.g., 1-methylborabenzene. U.S. Pat. Nos. 5,554,775, 5,637, 659, and 6,034,027, the teachings of which are herein incorporated by reference, teach how to prepare catalysts that contain a boraaryl ligand.

In addition to a boraaryl ligand, the catalyst contains other ligands. The total number of ligands satisfies the valence of the transition metal. The ligands can be bridged or non-bridged. Examples include substituted or unsubstituted cyclopentadienyls, indenyls, fluorenyls, halides, $C_1$–$C_{10}$ alkyls, $C_6$–$C_{15}$ aryls, $C_7$–$C_{20}$ aralkyls, dialkylamino, thioether, siloxy, alkoxy, and the like, and mixtures thereof. Halides, cyclopentadienyls, and indenyls are preferred.

Examples of boraaryl-based single-site catalysts are (borabenzene)(cyclopentadienyl)zirconium dichloride, (1-methylborabenzene)(cyclopentadienyl)zirconium dichloride, (borabenzene)(indenyl)-zirconium dichloride, (1-methylborabenzene)(indenyl)zirconium dichloride, (boranaphthalene)(cyclopentadienyl)zirconium dichloride, and (boraanthracenes)(cyclopentadienyl) zirconium dichloride.

Optionally, the catalyst is immobilized on a support. The support is preferably a porous material such as inorganic oxides and chlorides, and organic polymer resins. Preferred inorganic oxides include oxides of Group 2, 3, 4, 5, 13, or 14 elements. Preferred supports include silica, alumina, silica-aluminas, magnesias, titanias, zirconias, magnesium chloride, and crosslinked polystyrene. Silica is most preferred.

Preferably, the support has a surface area in the range of about 10 to about 700 m$^2$/g, a pore volume in the range of about 0.1 to about 4.0 mL/g, an average particle size in the range of about 10 to about 500 μm, and an average pore diameter in the range of about 10 to about 1000 Å. They are preferably modified by heat treatment, chemical modification, or both. For heat treatment, the support is preferably heated at a temperature from about 50° C. to about 800° C. More preferably, the temperature is from about 50° C. to about 300° C.

Suitable chemical modifiers include organoaluminum, organosilicon, organomagnesium, and organoboron compounds. Organosilicon and organoboron compounds, such as hexamethyldisilazane and triethylborane, are preferred. Suitable techniques to support a single-site catalyst are taught, for example, in U.S. Pat. No. 6,211,311, the teachings of which are incorporated herein by reference.

The catalyst is used with an activator. Activators can be combined with the Group 4 metal catalyst and the optional support or they can be added separately to the polymerization reactor. Suitable activators include anionic compounds of boron and aluminum, trialkylborane and triarylborane compounds, and the like. Examples are lithium tetrakis (pentafluorophenyl) borate, triphenylcarbenium tetrakis (pentafluorophenyl) borate, tris(pentafluorophenyl) borane, methyl alumoxane (MAO), the like and mixtures thereof. Activators are generally used in an amount within the range of about 0.01 to about 100,000, preferably from about 0.1 to about 1,000, and most preferably from about 0.5 to about 300, moles per mole of the single-site catalyst.

The catalyst is alkylated with triisobutyl aluminum (TIBAL). By "alkylated," we mean that the catalyst is allowed to react with TIBAL for a period of time sufficient to effectively increase the LCBI. The alkylation usually takes longer than 10 minutes. We have found that merely premixing the catalyst with TIBAL prior to the polymerization does not effectively increase the LCBI (see Comparative Example 7, LCBI is only 0.67). We have also found that when the catalyst is alkylated with triethyl aluminum, the polyethylene produced has a low LCBI (see Comparative Example 4, LCBI is only 0.35).

The alkylation reaction of the catalyst with TIBAL is preferably performed in solution by slowly adding TIBAL to the catalyst. Suitable organic solvents for the reaction include aliphatic and aromatic hydrocarbons. Examples are heptane, butane, cyclohexane, and toluene. The solvent can be removed after the alkylation. If it does not interfere with the polymerization, the solvent can be left in the catalyst. Elevated temperature is not needed for the reaction.

The molar ratio of TIBAL to the Group 4 metal catalyst is preferably within the range of about 0.5 to about 500, more preferably from about 1 to about 100, and most preferably from about 2 to about 20.

Polymerization is conducted in the presence of the alkylated catalyst. It can be conducted in bulk, solution, gas phase, or slurry phase. Gas phase and slurry phase processes are preferred. Methods and apparatus for gas phase polymerization of ethylene with Ziegler catalysts are well known, and they are suitable for use in the process of the invention. For example, U.S. Pat. No. 5,859,157, the teachings of which are herein incorporated by reference, teaches in detail gas phase polymerization of ethylene with a Ziegler catalyst. The slurry phase polymerization is performed in an organic solvent that can disperse the catalyst and polyethylene. Suitable solvents include $C_4$ to $C_{10}$ linear, branched, and cyclic aliphatic, and $C_6$–$C_{12}$ aromatic hydrocarbons. Examples of suitable solvents are butane, hexane, cyclohexane, octane, and isobutane.

The polymerization is preferably conducted under pressure. The pressure is preferably in the range of about 150 to about 15,000 psi, more preferably from about 200 to about 5,000 psi, and most preferably from about 200 to about 2,000 psi. Generally, the higher the pressure, the more productive the process. Laboratory operations are conducted under relatively low pressure for safety reasons.

A scavenger is preferably used in the polymerization. Scavengers reduce the effect of a trace amount of moisture and oxygen existing in the reactor on the polymerization and increase the activity and lifetime of the catalysts. Suitable scavengers include alkyl aluminum compounds. Scavengers are added into the reactor prior to the addition of the trialkyl aluminum-treated catalyst slurry. The amount of scavenger is about 1 to 500 times the amount of the trialkyl aluminum-treated catalyst slurry.

The invention also includes the ethylene polymers made by the process, including polyethylene and copolymers of ethylene with a $C_3$–$C_{10}$ α-olefin. Suitable α-olefins include propylene, 1-butene, 1-hexene, and 1-octene, and the like, and mixtures thereof. The concentration of α-olefin is preferably less than about 10 wt % of ethylene in the reaction phase. We have found that if the α-olefin concentration is too high, the polyethylene has a low LCBI (see Comparative Example 6, LCBI is 0.23). The ethylene polymers of the invention have a LCBI greater than about 1. The polymers are widely used in the industry for making films, molded parts, and other products.

The following examples merely illustrate the invention. Those skilled in the art will recognize many variations that are within the spirit of the invention and scope of the claims.

EXAMPLE 1

Preparation of Polyethylene

Modification of Silica Support

Hexamethyldisilazane (12.5 parts) is slowly added to Davison 948 silica (100 parts, product of Davison Chemical Company) with stirring for two hours at 25° C. The treated silica is dried at 150° C. for 6 hours in a fluidized bed dryer with nitrogen flow, and then dispersed in heptane (3.5 mL heptane/g silica) to form a slurry. Triethylborane (24.5 parts, product of Aldrich, 95+%) is slowly added to the slurry with stirring. The slurry is heated and refluxed at 100° C. for 6 hours and then cooled to 25° C. The modified support is isolated by removing the solvent and it is then dried under vacuum.

Preparation of Catalyst

Cyclopentadienyl(1-methylborabenzene)zirconium dichloride (68.6 parts) and trityl tetrakis(pentafluorophenyl) borate (278.5 parts) are dissolved in toluene (3772 parts). The solution is added to the modified support (2159 parts) with stirring at 30° C. for 7 hours. The supported catalyst is dried under vacuum at 25° C. for 7.5 hours.

Alkylating the Catalyst

Triisobutyl aluminum (TIBAL, 4 mL, 0.2 mole/L solution in heptane) is slowly added to 4.65 grams of the catalyst in a flask at 25° C. with stirring for an hour. The mixture is dried under vacuum at 25° C. for two hours, yielding a solid alkylated catalyst.

Polymerization

Fatty amine (4 mg, Armostat® 710, product of Akzo Nobel) and isobutane (about 350 mL) are charged into a 1L stainless-steel autoclave. Ethylene is added to the reactor to 450 psig total pressure. The reactor contents are heated to 85° C. The alkylated catalyst (22.5 mg) is premixed with TIBAL (0.4 mL, 1.0 M in heptane) in an injector at 25° C. for 10 minutes and then injected into the reactor with about 50 mL of isobutane. The reaction is carried out at 85° C. for 30 minutes. The polymer is collected after the solvent is vented from the reactor; it is then dried in a vacuum oven to a constant weight. The polymer has LCBI: 1.0, $MI_2$:0.26 dg/min, and $MI_{20}$:63 dg/min.

EXAMPLE 2

The procedure of Example 1 is repeated but in the polymerization step, the alkylated catalyst is used without premixing with TIBAL. The polyethylene has LCBI: 1.6, $MI_2$:0.18 dg/min, and $MI_{20}$:73 dg/min.

EXAMPLE 3

The procedure of Example 1 is repeated but in the alkylating step, the resulting alkylating mixture is not dried and it is directly used in the polymerization. The polyethylene has LCBI: 1.1, $MI_2$:0.23 dg/min, and $MI_{20}$: 39 dg/min.

Comparative Example 4

The procedure of Example 3 is repeated but in the alkylating step, triethyl aluminum, rather than TIBAL, is used. The polyethylene has LCBI: 0.35, $MI_2$:0.99 dg/min, and $MI_{20}$:39 dg/min.

EXAMPLE 5

The procedure of Example 3 is repeated but in the polymerization step, 10 mL of 1-hexene is added together with ethylene. The polyethylene has LCBI: 1.1, $MI_2$:0.25 dg/min, and $MI_{20}$:49 dg/min.

Comparative Example 6

The procedure of Example 5 is repeated but in the polymerization step, 40 mL, rather than 10 mL, of 1-hexene is added together with ethylene. The polyethylene has LCBI: 0.23, $MI_2$:4.8 dg/min, and $MI_{20}$:29 dg/min.

Comparative Example 7

The procedure of Example 1 is repeated but the catalyst is not alkylated, but merely premixed with TIBAL in the polymerization step. The polyethylene has LCBI: 0.67, $MI_2$:0.37 dg/min, and $MI_{20}$:54 dg/min.

We claim:

1. A process that comprises polymerizing ethylene or a mixture of ethylene and up to 10 wt % of a $C_3$–$C_{10}$ α-olefin in the presence of an activator and a Group 4 metal catalyst having at least one boraaryl ligand;

wherein the catalyst is alkylated for at least 10 minutes before use in polymerization with triisobutyl aluminum; and wherein the polyethylene produced has a long-chain-branching index (LCBI) of 1 or greater.

2. The process of claim 1 wherein the $C_3$–$C_{10}$ α-olefin is selected from the group consisting of propylene, 1-butene, 1-pentene, 1-hexene, 1-octene, and mixtures thereof.

3. The process of claim 1 wherein the $C_3$–$C_{10}$ α-olefin is 1-hexene.

4. The process of claim 1 wherein the Group 4 metal is zirconium.

5. The process of claim 1 wherein the boraaryl ligand is selected from the group consisting of borabenzenes, boranaphthalenes, boraanthracenes, and boraphenathrenes.

6. The process of claim 1 wherein the boraaryl ligand is 1-methyl borabenzene.

7. The process of claim 1 wherein the catalyst further comprises a ligand selected from the group consisting of cyclopentadienyls, indenyls, fluorenyls, halides, alkyls, aryls, aralkyls, dialkylaminos, siloxys, thioether, and alkoxys.

8. The process of claim 1 wherein two ligands of the catalyst are bridged.

9. The process of claim 1 wherein the Group 4 metal catalyst is cyclopentadienyl(1-methylborabenzene) zirconium dichloride.

10. The process of claim 1 wherein the activator is selected from the group consisting of anionic compounds of boron or aluminum, trialkylboron compounds, and triarylboron compounds.

11. The process of claim 1 wherein the activator is trityl tetrakis(pentafluorophenyl)borate.

12. The process of claim 1 wherein the activator is an alumoxane.

13. A polyethylene produced according to the process of claim 1.

* * * * *